United States Patent [19]

Umetsu et al.

[11] Patent Number: 5,253,004
[45] Date of Patent: * Oct. 12, 1993

[54] CONTROL DEVICE FOR CAMERA

[75] Inventors: Junji Umetsu, Tokyo; Fuminori Ueno, Hachioji, both of Japan

[73] Assignee: Asahi Kogaku Kogyo Kabushiki Kaisha, Tokyo, Japan

[*] Notice: The portion of the term of this patent subsequent to Jan. 7, 2009 has been disclaimed.

[21] Appl. No.: 797,161

[22] Filed: Nov. 26, 1991

Related U.S. Application Data

[63] Continuation of Ser. No. 556,375, Jul. 23, 1990, abandoned.

Foreign Application Priority Data

Jul. 28, 1989 [JP] Japan ................................. 1-195887

[51] Int. Cl.⁵ ............................................. G03B 15/03
[52] U.S. Cl. ................................................ 354/149.11
[58] Field of Search .................... 354/149.11, 152, 226, 354/266, 270

[56] References Cited

U.S. PATENT DOCUMENTS

| | | | |
|---|---|---|---|
| 4,204,759 | 5/1980 | Yamada et al. | 354/149.11 |
| 4,350,423 | 9/1982 | Engelsmann et al. | 354/173.1 |
| 4,472,042 | 9/1984 | Iwata et al. | 354/418 |
| 4,970,539 | 11/1990 | Sasagaki et al. | 354/149.1 |
| 4,982,210 | 1/1991 | Shimada et al. | 354/149.1 |
| 5,079,574 | 1/1992 | Ueno | 354/149.11 |

FOREIGN PATENT DOCUMENTS

| | | |
|---|---|---|
| 3301730 | 3/1984 | Fed. Rep. of Germany . |
| 2850913 | 5/1984 | Fed. Rep. of Germany . |
| 2011098 | 7/1979 | United Kingdom . |

*Primary Examiner*—David M. Gray
*Attorney, Agent, or Firm*—Sandler, Greenblum & Bernstein

[57] ABSTRACT

A control device for a camera includes a single motor, a mechanism for controlling a built-in electronic flash, a mechanism for controlling a mirror, a mechanism for controlling a shutter, and a connecting mechanism that connects the single motor to those control mechanisms. The connecting mechanism operates the mirror control mechanism and the shutter charge mechanism when the motor is rotated in a forward direction, and causes the flash control mechanism to switch the electronic flash to a projected position when the motor is rotated in a reverse direction.

24 Claims, 5 Drawing Sheets

CONTROL DEVICE FOR CAMERA

This application is a continuation, of application Ser. No. 07/556,375, filed Jul. 23, 1990, now abandoned.

BACKGROUND OF THE INVENTION

1. Field of the Invention

The present invention relates to a device for controlling and driving mechanisms installed in an electrically operated camera.

2. Description of the Related Art

Conventionally, for an electrically operated camera, such as a construction in which a mirror control mechanism, a shutter charge mechanism and so on are electrically operated by a motor is known. Although some such cameras are constructed in such a manner that a built-in electronic flash is electrically controlled so that a position thereof is switched between an electronic flash (projected) position and a retracted position, this built-in electronic flash is operated by a drive source other than the motor used for driving the mirror control mechanism and the shutter charge mechanism. Namely, in some electrically operated cameras, a separate motor is provided for switching a position of the built-in electronic flash. In other such cameras, although the motor for the mirror control mechanism and the shutter charge mechanism is also used for retracting the built-in electronic flash to the retracted position, an actuator such as a magnet is provided for switching the built-in electronic flash to the projected position.

If such an actuator is provided for switching a position of the built-in electronic flash, however, not only does the construction of the camera become complicated, but also a desired miniaturization of the camera cannot be effected. Further, the addition of the actuator causes an increase in the cost of the manufacturing camera.

SUMMARY OF THE INVENTION

Therefore, an object of the present invention is to provide a control device in which a position of a built-in electronic flash is switched by a drive motor that is used for driving a mirror control mechanism and a shutter charge mechanism, so that an exclusive actuator for the built-in electronic flash need not be provided such an electrically operated camera is simpler to manufacture and is miniaturized, while the manufacture cost of the camera is reduced.

According to the present invention, there is provided a control device comprising a single drive source, means for changing a position of a built-in electronic flash between a projected position and a retracted position, means for driving a mechanism other than the built-in electronic flash, and means for connecting the single drive source to the electronic flash position changing means and to the other mechanism drive means.

The other mechanism referred to above is provided for a photographing operation of the camera, and the connecting means is able to control at least the drive means for the other mechanism when the drive source is rotated in a first direction, and is able to control the electronic flash position changing means to move the built-in electronic flash to the projected position when the drive source is rotated in a second direction opposite to the first direction.

Further, according to the present invention, there is provided a control device comprising a drive source, means for changing a position of an electronic flash between a projected position and a retracted position, and means for driving a mechanism other than the electronic flash, the other mechanism being provided for a photographing operation of the camera.

The drive source is connected to the electronic flash position changing means and the drive means for the other mechanism in such a manner that at least the drive means for the other mechanism can be controlled when the drive source is rotated in a first direction, and the electronic flash position changing means can be controlled to move the electronic flash to the projected position when the drive source is rotated in a second direction opposite to the first direction.

In the present invention, an exclusive drive source, e.g., actuator, for switching a position of the built-in electronic flash is not provided, and a drive source for driving mechanisms, such as, a mirror control mechanism, and a shutter charge mechanism, is also used for switching the position of the built-in electronic flash. Therefore, according to the present invention, the construction of the manufacturing electrically operated camera is simplified and miniaturized, and the cost thereof is reduced.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

The present invention will now be described with reference to embodiments shown in the drawings.

Each drawing shows the mechanisms of a camera to which an embodiment of the present invention is applied, wherein FIGS. 1, 3, 4, and 5 show each mechanism when in an initial position, a built-in electronic flash when moved to the projected position, the mirror when switched to an up (withdrawn) position, and the camera when in a latter half of a charge operation, respectively.

In these drawings, the device of the present embodiment comprises a mirror control mechanism 100, a charge mechanism 200, an electronic flash control mechanism 300, and an aperture control mechanism 400. The mirror control mechanism 100 switches a position of a movable mirror 110 between an observing position, in which a subject to be photographed is observed by the mirror 110 and a withdrawn position, in which an exposure is carried out; the charge mechanism 200 carries out a charge operation for a shutter (not shown) of the camera; the electronic flash control mechanism 300 switches a position of a built-in electronic flash 301 between a projected position and a retracted position; and the aperture control mechanism 400 switches an aperture (not shown) between a stopping down state and a fully-open aperture state. A sequence motor 99 is connected to the mirror control mechanism 100, the charge mechanism 200, the electronic flash control mechanism 300, and the aperture control mechanism 400 through a connection mechanism that includes a gear train 10, to thereby drive these mechanisms.

The movable mirror 110 is fixed to a movable mirror seat 111, which is rotatably supported by a support frame (not shown) provided in the camera, through a pin 112, and is always urged toward the observing position (shown in FIG. 1) by a mirror restoration spring 113. The mirror control mechanism 100 also comprises a mirror-up member 101, which is rotatably supported by a pin 102. One end of the mirror-up member 101 is engaged with an engaging pin 114 provided in the movable mirror seat 111, and a center portion of the mirror-up member 101 is engaged with a mirror-up cam 103, which is integrally connected to a one-revolution gear 22. The mirror-up cam 103 and the one-revolution gear 22 are rotatably supported by a support shaft 104 provided at the support frame.

Figures 1, 2:
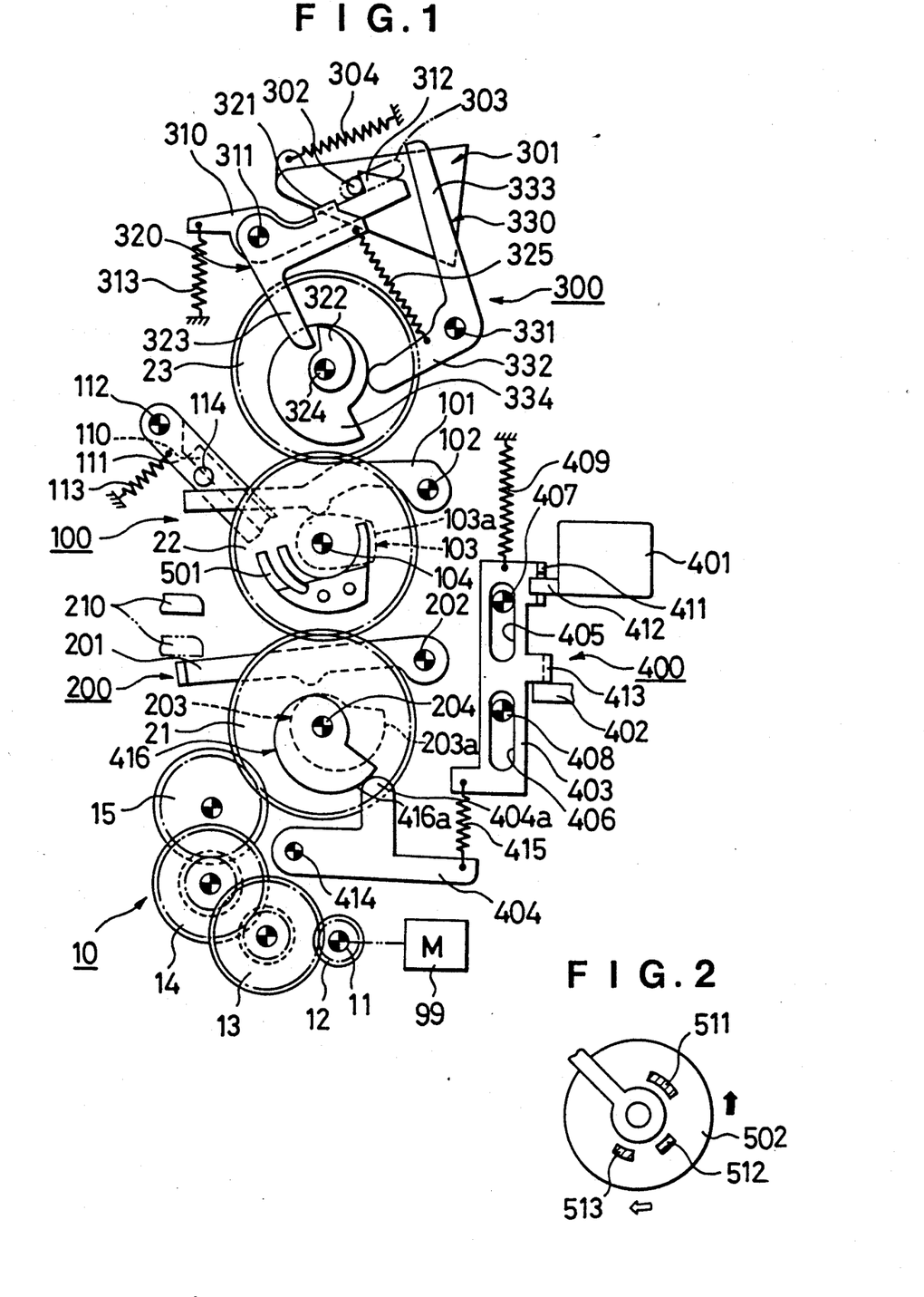
FIG. 1 is a view showing an embodiment of the present invention when the concerned mechanisms of the camera are in an initial position.
FIG. 2 is a plane view of a state sensing code plate of a state switch.

In the initial position shown in FIG. 1, the mirror-up member 101 is at a downward rotated position, and the movable mirror seat 111 is urged by the mirror restoration spring 113 and is in a position that is attained after a clockwise rotation thereof. Namely, at this time, the mirror 110 is located at the observing position before photographing. If the one-revolution gear 22 and the mirror-up cam 103 are rotated, a nose portion 103a of the cam 103 engages with the mirror-up member 101, and the mirror-up member 101 rotated clockwise in the drawing, whereby mirror-up member 101 is engages with the engaging pin 104. Thus, the movable mirror seat 111 is rotated counterclockwise against the spring force of the mirror restoration spring 113. As a result, the mirror 110 is switched to the withdrawn position in which an exposure is carried out.

As shown in FIG. 1, a set lever 210 of the shutter can be turned between a charge completion position, shown by a solid line, and a shutter operation completion position, shown by a chained line. The set lever 210 is rotated upward by a shutter charge member 201 of the charge mechanism 200, and is switched to the charge completion position, in which a first blind and a second blind (not shown) of the shutter are charged. Namely, in this state, an engaging member (not shown) is engaged with the first and second blinds and the set lever 210, so that the first and second blinds and the set lever 210 are fixed in the charge completion position.

The shutter charge member 201 is rotatably attached to the support frame by pin 202. A tip portion of the shutter charge member 201 is engagable with set lever 210, and a center portion of the shutter charge member 201 engages charge cam 203, which is integrally connected to a one-revolution gear 21. The charge cam 203 and the one-revolution gear 21 are rotatably supported by a support shaft 204 that is provided in the support frame.

Figure 4:
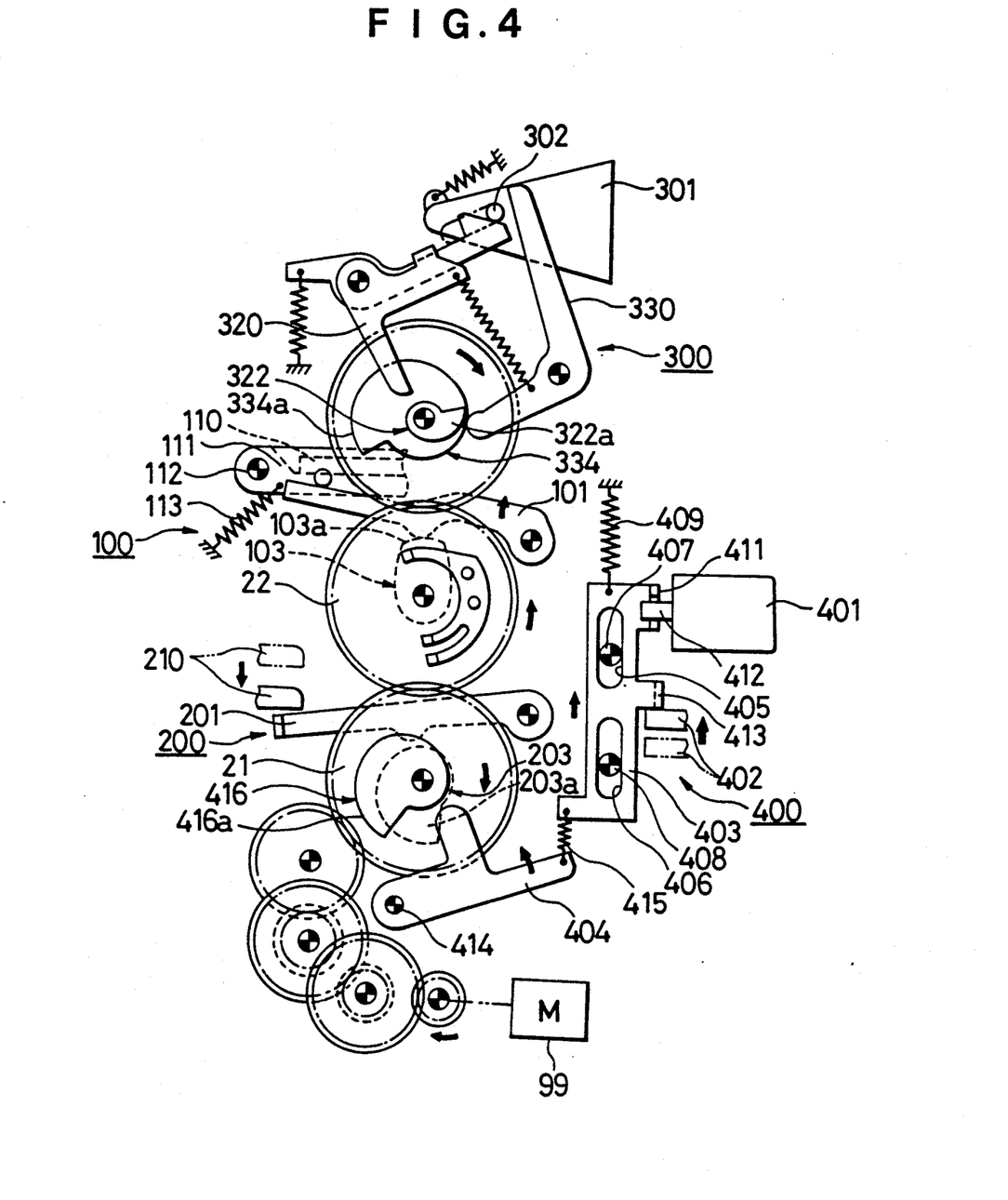
FIG. 4 is a view showing the embodiment of FIG. 1 when a mirror is withdrawn and a shutter has just been released.
Figure 5:
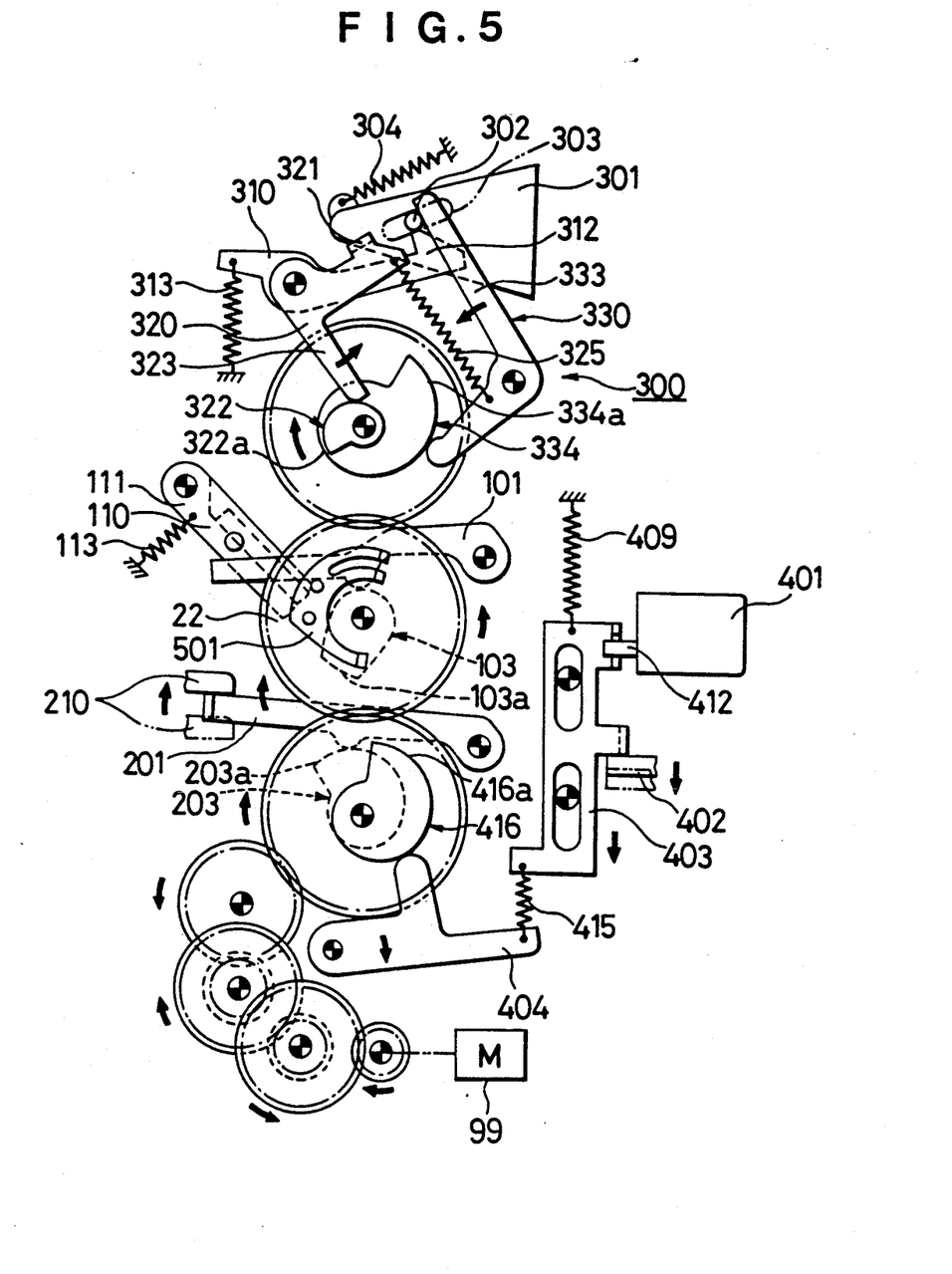
FIG. 5 is a view showing a latter half of a shutter charge operation.

In the initial position shown in FIG. 1, the shutter charge member 201 is at a downward rotated position, and the set lever 210 is at an up position, i.e., the charge completion position. In this state, if the shutter is released, as shown in FIG. 4, the set lever 210 is moved downward by the spring force of a spring (not shown) and engaged with the shutter charge member 201. On the other hand, if the one-revolution gear 21 and the charge cam 203 are rotated so that a nose portion 203a of the charge cam 203 is engaged with the charge member 201, as shown in FIG. 5, the charge member 201 is rotated clockwise, whereby the set lever 210 is pushed upward. Thus the shutter is charged.

The built-in electronic flash 301 can be switched between a projected position, i.e., flash operating position, and a retracted position. The built-in electronic flash 301 is positioned at the retracted position in FIGS. 1, at the projected position in FIG. 3 and 4, and is moving from the projected position to the retracted position in FIG. 5.

The built-in electronic flash 301 is provided with a guide pin 302 that engages guide slit 303 formed in the support frame. Therefore, the guide pin 302 is moved along the guide slit 303 so that the electronic flash 301 is switched between the projected position and the retracted position. The built-in electronic flash 301 is always urged by a pop-up spring 304 in a direction in which the electric flash is moved from the retracted position towards the projected position.

The electronic flash mechanism 300 for carrying out a switching operation of a position of the built-in electronic flash 301 comprises an engaging member 310, a release member 320, and a flash retracting member 330.

The engaging member 310 is pivoted about a pin 311 provided at the support frame, and the release member 320 is also rotatably supported by the pin 311. An end portion of the engaging member 310 is provided with a projection 312 that is engagable with the guide pin 302. The other end portion of the engaging member 310 is connected to an engaging spring 313 that is connected to the support frame, whereby the engaging member 310 is always urged in the counterclockwise direction in the drawings.

The release member 320 is provided with a bent portion 321 that is engagable with the engaging member 310, and an arm portion 323 that is engagable with a release cam 322, and which is integrally connected to a one-revolution gear 23. The release cam 322 and the one-revolution gear 23 are rotatably supported by a support shaft 324 provided at the support frame. A portion near the bent portion 321 of the release member 320 is connected to an engaging arm 332 of the flash retracting member 330, by a spring 325.

The flash retracting member 330 is rotatably supported by a pin 331 provided at the support frame. A press arm 333 of the flash retracting member 330 is engagable with the guide pin 302 of the electronic flash 301. An engaging arm 332 extended in the opposite direction to the press arm 333 is engagable with a retraction cam 334, which is integrally fixed to the one-revolution gear 23 in the same way as the release cam 322.

Figure 3:
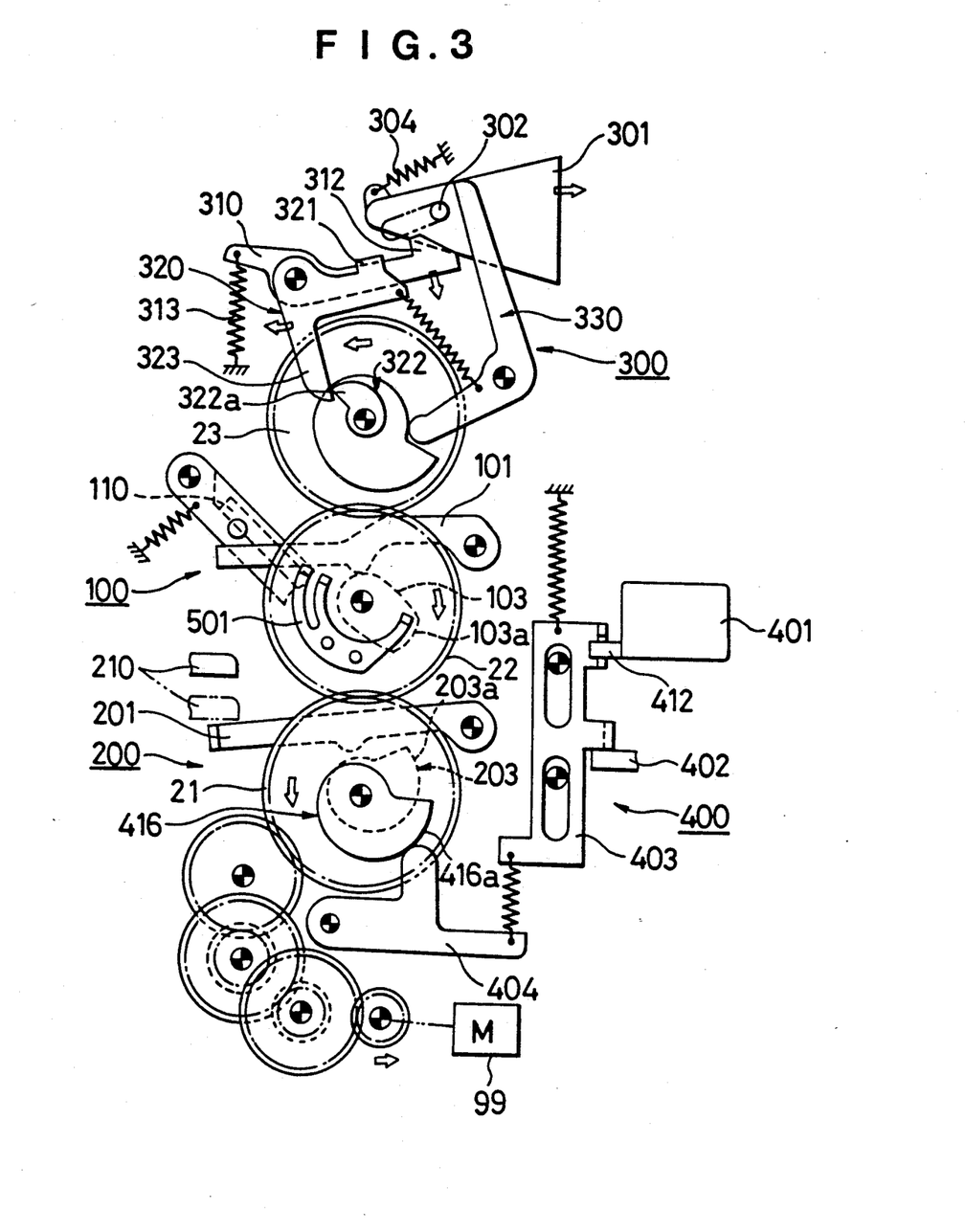
FIG. 3 is a view showing the embodiment of FIG. 1 when a built-in electronic flash is moved to a projected position.

In the initial position shown in FIG. 1, the projection 312 of the engaging member 310 is engaged with the guide pin 302 of the electronic flash 301, so that the electronic flash 301 is at the retracted position. In this state, if the release cam 322 is rotated counterclockwise in the drawing, and a nose portion 322a of the release cam 322 is pressed against the arm portion 323 of the release member 320, as shown in FIG. 3, the release member 320 is rotated clockwise, so that the bent portion 321 urges the engaging member 310 to rotate clockwise. As a result, the projection 312 of the release member 320 releases the guide pin 302. Thus, the electronic flash 301 is urged by the pop-up spring 304 and displaced rightward in the drawing to the projected position.

The aperture control mechanism 400 comprises a control block 401 that includes a circuit for setting an aperture, an aperture restriction lever 402, a slide plate 403, and a fully-open aperture set member 404.

The slide plate 403 is provided with two guide slots 405 and 406, which engage guide pins 407 and 408 that are fixed to the support frame to guide the slide plate 403 when moving up and down in the drawing. The slide plate 403 is always urged upward by a return spring 4009, and a projection 411, formed on a upper end of the slide plate 403, is engaged with a lever 412 of the aperture control block 401 whereby, when the slide plate 403 is moved up and down, the lever 412 is displaced to control the aperture.

A projection 413 formed on a center portion of the slide plate 403 engages an upper surface of the aperture restriction lever 402, to restrict an upward movement of the aperture restriction lever 402. The aperture restriction lever 402 is urged upward by a spring (not shown), i.e., in a direction in which an aperture is stopped down. In FIG. 1, the aperture restriction lever 402 is at the lowest position, i.e., at the fully-open aperture position.

The fully-open aperture set member 404 is rotatably supported by a pin 414 provided at the support frame, and an end portion of the set member 404 is connected to the slide plate 403 through a connecting spring 415. A center portion 404a of the fully-open aperture set member 404 engages an aperture control cam 416, which is integrally fixed to the one-revolution gear 21, in the same way as charge cam 203.

In the initial position shown in FIG. 1, the fully-open aperture set member 404 is engaged with a nose portion 416a of the aperture control cam 416. Thus, it is at a downward displaced position. At this time, the slide plate 403 is pulled by the connecting spring 415 to be positioned at the lowest position thereof, therefore, the aperture restriction lever 402 is at the lower position, i.e., a fully-open aperture position, and the lever 412 of the aperture control block 401 is at a fully-open aperture position. Namely, the aperture is set to the fully-open state. In this state, if the one-revolution gear 21 and the aperture control cam 416 are rotated clockwise in the drawing, the fully-open aperture set member 404 is released from the nose portion 416a of the aperture control cam 416 and rotates counterclockwise, as shown in FIG. 4, and as a result, the slide plate 403 is released from the spring 415 and pulled by the spring 409 to move upward, so that the aperture restriction lever 402 and the lever 412 of the aperture control block 401 are moved upward, whereby a predetermined aperture is obtained.

The mechanisms 100, 200, 300, and 400 are driven by a single drive source, i.e., the sequence motor 99, in this embodiment. The gear train 10 connecting these mechanisms 100, 200, 300 and 400 and the sequence motor 99 includes a pinion gear 12 provided at an output shaft 11 of the sequence motor 99, reduction gears 13 and 14, an idle gear 15, and one-revolution gears 21, 22, and 23. The pinion gear 12 is meshed with the reduction gear 13. Thus, the reduction gears 13 and 14 reduce the number of revolutions of the pinion gear 12, and transmit the reduced number of revolutions to the idle gear 15, which is meshed with the one-revolution gear 21. The one-revolution gears 21, 22, and 23 have the same number of teeth, and the one-revolution gear 21 is meshed with the one-revolution gear 22, which is meshed with the one-revolution gear 23. Accordingly, the one-revolution gears 21, 22, and 23 are rotated at the same angle to each other.

The one-revolution gear 22 is provided with a state sensing brush 501, which is disposed so as to face a state sensing code plate 502 shown in FIG. 2, and is engagable with three contacts 511, 512, and 513 formed on the code plate 502. These contacts (i.e., 511, 512, and 513) are in slidable contact with the brush 501. A state switch is constructed by the state sensing brush 501 and the contacts 511, 512, and 513, so that states of the built-in electronic flash 301, the mirror control mechanism 100, the charge mechanism 200 and the aperture control mechanism 400 are sensed by contact between the brush 501 and the contacts 511, 512, and 513.

The contact 512 located between the contacts 511 and 513 serves to set the mechanisms 100, 200, 300, and 400 to their initial positions. Contact 511, located at an upper position in the drawing, serves to stop the mirror at the upper position in accordance with a mirror-up signal. Contact 513, located at a lower position in the drawing, serves to stop a reverse revolution of the motor 99 when a pop-up signal for projecting the built-in electronic flash 301 is received while the motor 99 is rotated in the reverse direction.

An operation of the device described above will now be described below with reference to FIG. 6.

In the initial position, the mechanisms 100, 200, 300, and 400 are positioned in the state shown in FIG. 1. In this state, a release switch (not shown) is turned OFF, the sequence motor 99 is stopped, and the contact 512 is in contact with the brush 501 so that the state switch outputs a charge completion signal. In this state, the built-in electronic flash 301 is retracted, the mirror 110 is at the down position, (i.e., the observing position before photographing), the aperture is set to a fully-open aperture position, and the shutter is set to a charge completion position.

When it is determined by a photometry device (not shown) that an electronic flash is needed for photographing, or when the electronic flash is to be intentionally used, a pop-up signal is outputted from a control circuit (not shown). Upon receiving this pop-up signal, the sequence motor 99 is reversely rotated from the initial position. Thus, each of the one-revolution gears 21, 22 and 23 is rotated by a predetermined angle, as shown by white arrows in FIG. 3. As a result, the state sensing brush 501 comes into contact with the contact 513 (FIG. 2) of the state switch. Thus, a signal for projecting the electronic flash 301 is output. At the same time, the one-revolution gear 23 is rotated so that, as shown in FIG. 3, the release cam 322 rotates the release member 320 clockwise and the engaging member 310 is rotated due to an engagement of the bent portion 321 and the engaging member 310, whereby the projection 312 of the engaging member 310 releases the guide pin 302. Accordingly, the built-in electronic flash 301 is moved by the spring force of the pop-up spring 304, and switched to the projected position. FIG. 3 shows the state immediately after the built-in electronic flash 301 has been switched to the projected position. After a predetermined set time (approx. 10 ms, for example) has elapsed, the sequence motor 99 is rotated in the forward direction. Thus, the mechanisms 100, 200, 300, and 400 are returned to the initial position thereof, as shown in FIG. 1.

In the pop-up completion position of the electronic flash 301 shown in FIG. 3, since the mirror-up member 101 of the mirror control mechanism 100 is not engaged with the nose portion 103a of the mirror-up cam 103, the mirror-up member 101 is not moved upward. Thus, the mirror 110 is at the down position, i.e., the observing position before photographing. The fully-open aperture set member 404 of the aperture control mechanism 400 is engaged with the nose portion 416a of the aperture control cam 416, as shown in FIG. 1. Thus, the slide plate 403 is at the lowest position and the aperture restriction lever 402 is set to the fully-open aperture position. Further, since the shutter charge member 201 of the charge mechanism 200 is not engaged with the nose portion 203a of the charge cam 203, the shutter charge member 201 is not rotated upward, as shown in FIG. 1. Thus, the set lever 210 is at the charge completion position.

Note that, when the electronic flash 301 is not used, the sequence motor 99 is not reversely rotated but remains in the stopped state.

In the initial position shown in FIG. 1, i.e., in a state in which the state switch outputs a charge completion signal, if a shutter button (not shown) is pushed down, so that the release switch outputs an ON signal, the sequence motor 99 is rotated in the forward direction, whereby the one-revolution gear 22 is rotated as shown by a black arrow in FIG. 4. Thus, the nose portion 103a of the mirror-up cam 103 pushes up the mirror-up member 101. Accordingly, the mirror 110 is displaced upward against the return spring 113 and moved to the withdrawn position thereof, in which an exposure can be carried out.

At the same time, due to a rotation of the one-revolution gear 21, the nose portion 416a of the aperture control cam 416 releases the fully-open aperture set member 404. Therefore, the fully-open aperture set member 404 is rotated upward by the spring 415. Thus, the slide plate 403 is pulled by the return spring 409 and moved upward to a position to which it is restricted by the lever 412 of the aperture control block 401. As a result, the aperture restriction lever 402 is displaced from a position shown by a chained line to a position shown by a solid line, and stopped at a predetermined position, whereby the aperture is controlled to a set value.

Figure 6:
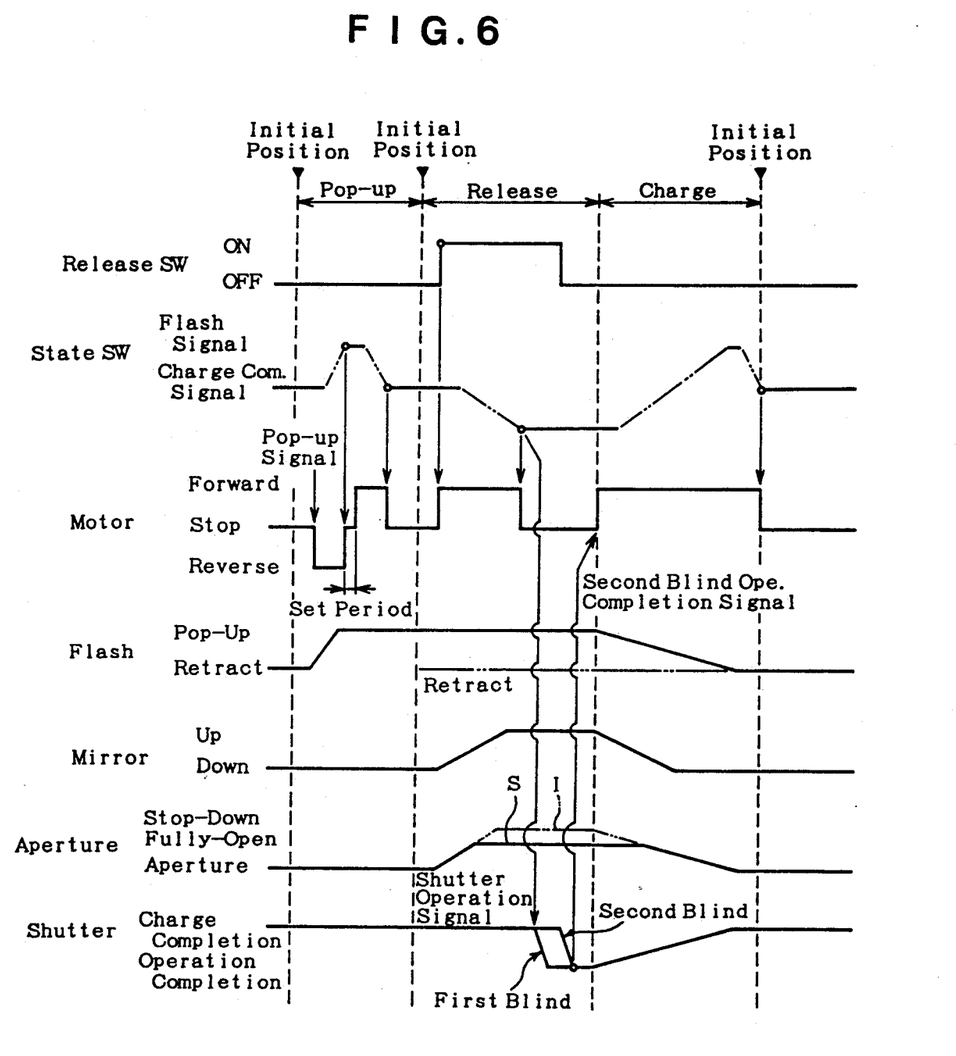
FIG. 6 is a graph showing a sequence of the operation of each mechanism.

Note that, in FIG. 6, the chained line I shows the state of a minimum aperture and the solid line S shows the state of an actual control of the aperture.

The sequence motor 99 is stopped when the mirror 110 is moved to an upper position and the contact 511 (FIG. 2) of the state switch comes into contact with the brush 501, so that a mirror-up signal is output.

On the other hand, the nose portion 203a of the charge cam 203 is not engaged with the charge member 201 of the charge mechanism 200, by a rotation of the one-revolution gear 21. Thus, the charge member 201 remains at the lower position. In this state, if a mirror-up signal is output, the first and second blinds of the shutter are operated in accordance with this signal, whereby the shutter is released, and at the same time, the set lever 210 is moved downward from the charge completion position, shown by a chained line, to the operation completion position, shown by a solid line. FIG. 4 shows a state immediately after the operation of the shutter is completed.

In this release operation of the shutter, the nose portion 334a of the retraction cam 334 is not engaged with the flash retracting member 330. Therefore, the flash retracting member 330 is not rotated and the electronic flash 301 is not retracted. Further, the nose portion 322a of the release cam 322 is not engaged with the release member 320; i.e., the electronic flash 301 remains in the projected position.

When the operation of the shutter is completed, a second blind operation completion signal is outputted, whereby the sequence motor 99 is rotated in the forward direction. Thus, the nose portion 334a of the retraction cam 334 of the electronic flash mechanism 300 causes the flash retracting member 330 to rotate counterclockwise, as shown by black arrows in FIG. 5. As a result, the press arm 333 of the flash retracting member 330 displaces the guide pin 302 along the guide slit 303, whereby the guide pin 302 engages the projection 312 of the engaging member 310, pressing engaging member 310 down against the engaging spring 313, and is moved toward the left end portion of the guide slit 303. Thus, the electronic flash 301 is moved to the retracted position. At the same time, the nose portion 322a of the release cam 322 engages the arm portion 323 of the release member 320, so that the release member 320 is rotated counterclockwise against the spring 325. Thus, the bent portion 321 is released from the engaging member 310.

Note that, if the built-in electronic flash 301 has been retracted when the shutter is released, although the flash retracting member 330 and the release member 320 are moved by the retraction cam 334 and the release cam 322, respectively, these members 330 and 320 substantially do no work, since the electronic flash 301 is at the retracted position.

On the other hand, since the nose portion 103a of the mirror up cam 103 is released from the mirror-up member 101, the mirror seat 111 is rotated downward by the spring force of the return spring 113. Thus, the mirror 110 is displaced to the observing position before exposure, and the mirror-up member 101 is rotated downward. At the same time, the nose portion 203a of the charge cam 203 engages the shutter charge member 201, so that the set lever 210 is pushed up from a position shown by a chained line, to a position shown by a solid line in FIG. 5. and thus the shutter is charged.

Further, at this time, the nose portion 416a of the aperture control cam 416 is engaged with the fully-open aperture set member 404. Thus, the fully-open aperture set member 404 is rotated clockwise. Accordingly, the connecting spring 415 pulls the slide plate 403 down against the return spring 409, and pulls the aperture restriction lever 412 down against a spring (not shown). Thus, the aperture is set to the fully-open aperture position.

Note that, in the charge operation shown in FIG. 5, although the state switch outputs a pop-up signal in a latter half of the charging operation, this signal is disregarded, and the sequence motor 99 is stopped by the charge completion signal.

As described above, when one photographing operation is carried out, basically all controls are carried out for a pop-up of the electronic flash 301, a release of the shutter, and a charge of the shutter, in this order.

Also as described above, the embodiment is constructed in such a manner that a switching operation of the built-in electronic flash 301 between the projected position and the retracted position is carried out by the sequence motor 99, which is also a drive source for the mirror control mechanism 100, the charge mechanism 200, and the aperture control mechanism 400. Therefore, an exclusive actuator for changing a position of the built-in electronic flash 301 need not be provided. Thus, space is not required in the camera for such an actuator.

In the above-described embodiment, the connection mechanism having the gear train 10 is not provided with a clutch mechanism, such as a planetary gear clutch, and is constructed to drive the mechanisms 100, 200, 300, and 400 by forward and reverse revolutions of the sequence motor 99. Therefore, the construction of the embodiment device is simplified, and the cost of manufacturing the device can be reduced.

Further, the embodiment is constructed in such a manner that, after the electronic flash 301 is moved to the projected position, each of the mechanisms 100, 200, 300, and 400 is returned to the initial position thereof. Therefore, the camera is in a photographing ready state immediately after the position of the electronic flash 301 is switched, and therefore the shutter can be again operated immediately after the shutter is once released.

Note that, in the present invention, the aperture control mechanism 400 need not be driven by the sequence motor 99, and a definition of the forward rotation and the reverse rotation of the sequence motor 99 is not restricted to the embodiment shown in the drawings. Namely, the terms forward rotation and the reverse rotation as used for the present invention mean only that these rotational directions are opposite to each other.

Although the embodiments of the present invention have been described herein with reference to the accompanying drawings, obviously many modifications and changes may be made by those skilled in the art without departing from the scope of the invention.

We claim:

1. A control device for controlling mechanisms installed in a camera, comprising;
   a single drive source;
   means for changing a position of a built-in electronic flash between a projected position and a retracted position;
   means for driving a mechanism other than said built-in electronic flash, said other mechanism being provided for a photographing operation of said camera; and
   means for connecting said drive source to said position changing means and said drive means, said connecting means being able to control at least said drive means when said drive source is rotated in a first direction, and being able to control said position changing means to move said built-in electronic flash to said projected position when said drive source is rotated in a second direction opposite to said first direction, wherein said drive means controls a photographing operation which is independent of movement of said electronic flash.

2. A control device according to claim 1, wherein said connecting means is able to control said position changing means to move said built-in electronic flash to said retracted position when said drive source is rotated in said first direction when said built-in electronic flash is in said projected position.

3. A control device for controlling mechanisms installed in a camera, comprising;
   a single drive source;
   means for changing a position of a built-in electronic flash between a projected position and a retracted position;
   means for driving a mechanism other than said built-in electronic flash, said other mechanism being provided for a photographing operation of said camera; and
   means for connecting said drive source to said position changing means and said drive means, said connecting means being able to control at least said drive means when said drive source is rotated in a first direction, and being able to control said position changing means to move said built-in electronic flash to said projected position when said drive source is rotated in a second direction opposite to said first direction, wherein said drive means controls a mirror control mechanism for changing a position of a movable mirror between an observing position, in which a subject to be photographed is observed by said mirror, and a withdrawn position, in which an exposure can be carried out.

4. A control device for controlling mechanisms installed in a camera, comprising;
   a single drive source;
   means for changing a position of a built-in electronic flash between a projected position and a retracted position;
   means for driving a mechanism other than said built-in electronic flash, said other mechanism being provided for a photographing operation of said camera; and
   means for connecting said drive source to said position changing means and said drive means, said connecting means being able to control at least said drive means when said drive source is rotated in a first direction, and being able to control said position changing means to move said built-in electronic flash to said projected position when said drive source is rotated in a second direction opposite to said first direction, wherein said drive means controls a charge mechanism for carrying out a charge operation of a shutter of said camera.

5. A control device for controlling mechanisms installed in a camera, comprising;
   a single drive source;
   means for changing a position of a built-in electronic flash between a projected position and a retracted position;
   means for driving a mechanism other than said built-in electronic flash, said other mechanism being provided for a photographing operation of said camera; and
   means for connecting said drive source to said position changing means and said drive means, said connecting means being able to control at least said drive means when said drive source is rotated in a first direction, and being able to control said position changing means to move said built-in electronic flash to said projected position when said drive source is rotated in a second direction opposite to said first direction, wherein said drive means controls an aperture drive mechanism for changing a state of an aperture between a first state, in which said aperture is stopped down, and a second state, in which said aperture is fully-open.

6. A control device according to claim 1, wherein said connecting means is provided with a main gear for controlling said position changing means and at least one sub-gear for controlling said drive means which is meshed with said main gear.

7. A control device according to claim 6, wherein said main gear and sub-gear have the same number of teeth.

8. A control device according to claim 6, wherein said connecting means is provided with a first cam fixed to said main gear and a second cam fixed to said sub-gear, said first and second cams having nose portions engagable with said position changing means and said drive means, respectively.

9. A control device according to claim 8, wherein said nose portion of said first cam is engaged with said position changing means and said nose portion of said second cam is not engaged with said drive means when said drive source is rotated in said second direction from an initial position of said drive source.

10. A control device according to claim 8, wherein said nose portion of said first cam is not engaged with said position changing means and said nose portion of said second cam is engaged with said drive means when said drive source is rotated in said first direction, so that a position of said built-in electronic flash is not changed and said other mechanism is activated.

11. A control device according to claim 1, wherein said position changing means comprises an engaging member, a release member and a flash retracting member, said engaging member, release member and flash retracting member being rotatably supported by said camera, said engaging member and said flash retracting member being engagable with said electronic flash, and said release member being engagable with said engaging member.

12. A control device according to claim 11, wherein said connecting means is provided with a gear for controlling said position changing means, and a release cam is fixed to said gear, said release cam engaging with said release member so that said release member and said engaging member are rotated together, whereby said electronic flash is moved to said projected position when said drive source is rotated in said second direction.

13. A control device according to claim 12, wherein said connecting means is provided with a retraction cam fixed to said gear, said retraction cam being able to engage with said retracting member so that said retracting member is moved to retract said electronic flash to said retracted position when said drive source is rotated in said first direction.

14. A control device according to claim 1, further comprising a state switch for sensing a state of said built-in electronic flash and a state of said other mechanism.

15. A control device according to claim 14, wherein said state switch comprises a state sensing brush provided at said connecting means, and a state sensing code plate that faces said connecting means and, has contacts in slidable contact with said brush, whereby said state of said built-in electronic flash and said other mechanism is sensed by a contact between said brush and said contacts.

16. A control device for driving mechanisms installed in a camera, comprising;
a drive source;
means for changing a position of an electronic flash between a projected position and a retracted position; and
means for driving a mechanism other than said electronic flash, said other mechanism being provided for a photographing operation of said camera;
said drive source being connected to said position changing means and said drive means in such a manner that at least said drive means can be controlled when said drive source is rotated in a first direction, and said position changing means can be controlled to move said electronic flash to said projected position when said drive source is rotated in a second direction opposite to said first direction, wherein said drive means controls a photographing operation which is independent of movement of said electronic flash.

17. A control device for driving a plurality of mechanisms in a camera, comprising:
a single drive source;
means for controlling an operation of a first mechanism; and
means for controlling an operation of a second mechanism, said means for controlling an operation of a first mechanism being connected to said single drive source in such a manner that at least said first mechanism is controllable when said single drive source is rotated in a first direction, said second mechanism being controllable when said single drive source is rotated in a second direction that is opposite to said first direction, and wherein said single drive source controls said operation of said second mechanism, and wherein at least one of said means for controlling controls a photographing operation which is independent of movement of a flash unit.

18. The control device of claim 17, wherein said first mechanism comprises an electronic flash.

19. The control device of claim 18, wherein said electronic flash is built into said camera.

20. A control device for controlling mechanisms installed in a camera, comprising;
a single drive source;
means for changing a position of a built-in electronic flash between a projected position and a retracted position;
means for driving a mechanism other than said built-in electronic flash, said other mechanism being provided for a photographing operation of said camera; and
means for connecting said drive source to said position changing means and said drive means, said connecting means being able to control at least said drive means when said drive source is rotated in a first direction, and being able to control said position changing means to move said built-in electronic flash to said projected position when said drive source is rotated in a second direction opposite to said first direction, said control being established only by changing the rotational direction of said drive source.

21. A control device for driving mechanisms installed in a camera, comprising;
a drive source;
means for changing a position of an electronic flash between a projected position and a retracted position; and
means for driving a mechanism other than said electronic flash, said other mechanism being provided for a photographing operation of said camera;

said drive source being connected to said position changing means and said drive means in such a manner that at least said drive means can be controlled only by rotation of said drive source in a first direction, and said position changing means can be controlled to move said electronic flash to said projected position only by rotation of said drive source in a second direction opposite to said first direction.

22. A control device for driving a plurality of mechanisms in a camera, comprising:
a single drive source;
means for controlling an operation of a first mechanism; and
means for controlling an operation of a second mechanism, said means for controlling an operation of a first mechanism being connected to said single drive source in such a manner that at least said first mechanism is controlled only by rotation of said single drive source in a first direction, said second mechanism being controlled only by rotation of said single drive source in a second direction that is opposite to said first direction;
wherein said drive source controls a movement of an electronic flash and a photographing operation which is independent of movement of said electronic flash.

23. The control device of claim 20, wherein said drive means controls a photographing operation which is independent of movement of said electronic flash.

24. The control device of claim 21, wherein said drive means controls a photographing operation which is independent of movement of said electronic flash.

* * * * *

UNITED STATES PATENT AND TRADEMARK OFFICE
CERTIFICATE OF CORRECTION

PATENT NO. : 5,253,004
DATED : October 12, 1993
INVENTOR(S) : J. UMETSU et al.

It is certified that error appears in the above-indentified patent and that said Letters Patent is hereby corrected as shown below:

At column 11, line 58 (claim 15, line 4), change "means and." to --- means and---.

Signed and Sealed this

Sixteenth Day of August, 1994

BRUCE LEHMAN

Attest:

Attesting Officer      Commissioner of Patents and Trademarks